United States Patent

Kamada et al.

Patent Number: 5,088,357
Date of Patent: Feb. 18, 1992

[54] AUTOMATIC TRANSMISSION CONTROL SYSTEM

[75] Inventors: Shinya Kamada; Hidehiko Mishima, both of Hiroshima, Japan

[73] Assignee: Mazda Motor Corporation, Hiroshima, Japan

[21] Appl. No.: 645,882

[22] Filed: Jan. 25, 1991

[30] Foreign Application Priority Data

Jan. 25, 1990 [JP] Japan ................................. 2-16445
Mar. 9, 1990 [JP] Japan ................................. 2-59595

[51] Int. Cl.⁵ ............................................. F16H 61/06
[52] U.S. Cl. ............................................. 74/868; 74/866
[58] Field of Search ........................... 74/866, 867, 868

[56] References Cited

U.S. PATENT DOCUMENTS 4,722,251 2/1988 Sumiya et al. ............... 74/868
4,889,016 12/1989 Kuwayama et al. .......... 74/868
4,930,080 5/1990 Suzuki ...................... 74/867 X

FOREIGN PATENT DOCUMENTS 62-83535 4/1987 Japan .

Primary Examiner—Dirk Wright
Attorney, Agent, or Firm—Fleit, Jacobson, Cohn, Price, Holman & Stern

[57] ABSTRACT

A hydraulic control system shifts an automatic transmission into at least a reverse range and a drive range having several forward speed gears by selectively coupling a plurality of frictional coupling elements, including a reverse coupling element. The control system includes a throttle, such as an orifice, for regulating hydraulic pressure applied to the reverse coupling element. A bypass circuit is provided in the control system for applying the hydraulic pressure, bypassing the throttle, to the reverse coupling element. The bypass circuit is opened when a specific operating condition of the automatic transmission of an engine is created, so as to apply the hydraulic pressure through the bypass circuit to the reverse coupling element to rapidly achieve a coupling of the reverse coupling element.

14 Claims, 7 Drawing Sheets

FIG. 2

TABLE I

| RANGE | | CLUTCH | | | | BRAKE | | 1-WAY CLUTCH | |
|---|---|---|---|---|---|---|---|---|---|
| | | 24 | 20 | 21 | 27 | 25 | 23 | 26 | 22 |
| P | | | | | | | | | |
| R | | O | | | | O | | | |
| N | | | | | | | | | |
| D | 1ST | | O | | | | | (O) | (O) |
| D | 2ND | | O | | | | O | | (O) |
| D | 3RD | | O | O | O | | | | (O) |
| D | 4TH | | O | | O | | O | | |
| 2 | 1ST | | O | | | | | (O) | (O) |
| 2 | 2ND | | O | O | | | O | | (O) |
| 2 | 3RD | | O | O | O | | | | (O) |
| 1 | 1ST | | O | O | | O | | | (O) |
| 1 | 2ND | | O | O | | | O | | (O) |

TABLE II

| | D | | | | | 2 | | | 1 | |
|---|---|---|---|---|---|---|---|---|---|---|
| | 1 | 2 | 2 3 | 3 | 4 | 1 | 2 | 3 | 1 | 2 |
| 1-2 SHIFT SOLENOID | OFF | ON | ON | ON | ON | OFF | ON | ON | OFF | ON |
| 2-3 SHIFT SOLENOID | ON | ON | ON | OFF | OFF | ON | ON | OFF | ON | ON |
| 3-4 SHIFT SOLENOID | ON | ON | OFF | OFF | ON | ON | OFF | OFF | OFF | OFF |

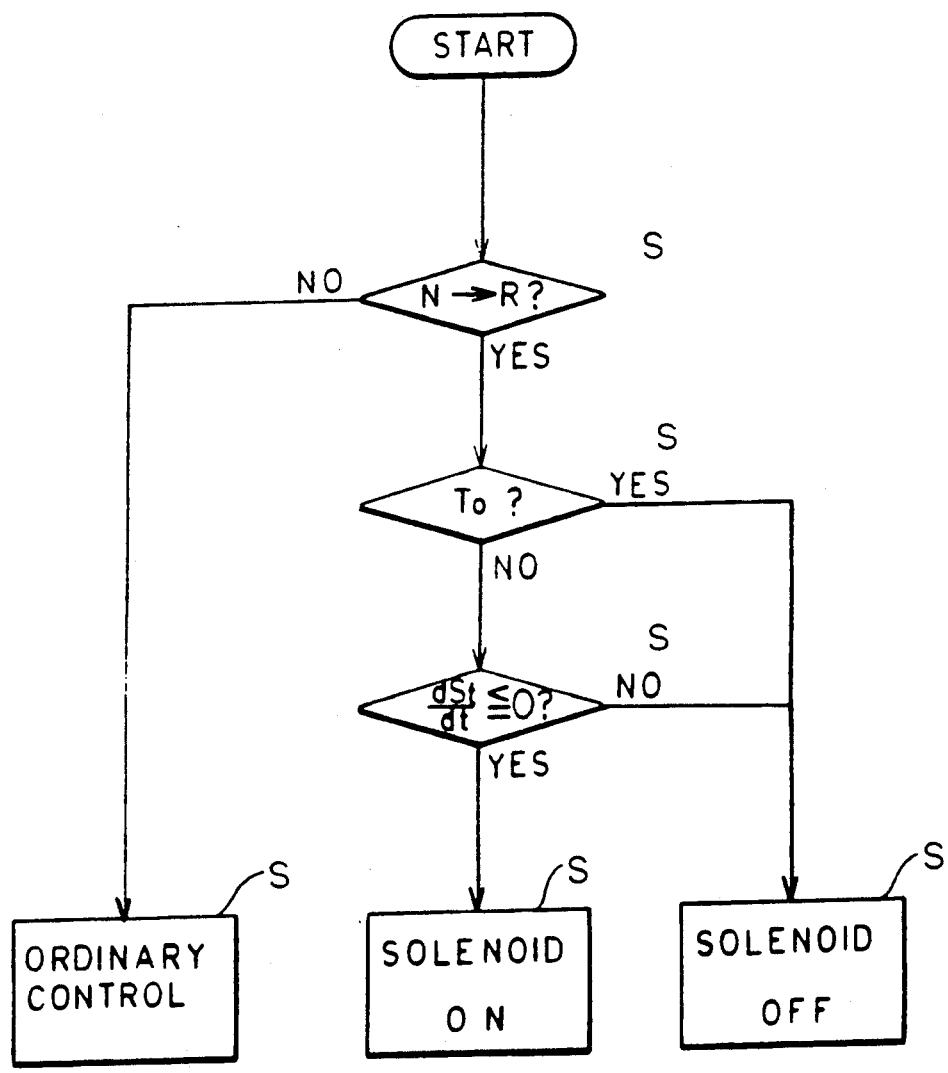

AUTOMATIC TRANSMISSION CONTROL SYSTEM

The present invention relates to a control system for an automatic automotive transmission.

BACKGROUND OF THE INVENTION

1. Field of the Invention

A control system for an automatic automotive transmission typically includes various frictional elements, such as clutches and brakes, which are controlled by a hydraulic circuit so as to form various paths of power transmission, thereby placing the automatic transmission in any desired range, such as a reverse range and several speed ranges in a forward range.

2. Description of Related Art

Such an automatic transmission control system includes a hydraulic circuit provided with a bypass pressure line with a control valve that allows oil to flow so as to bypass a throttle element, such as an orifice, in a pressure line for the frictional elements that are locked when the transmission is placed in a low speed range or in a middle speed range. The control valve is operated to open the bypass pressure line upon a gear shift from a neutral range to drive range when the temperature of oil is low, or upon an automatic gear shift during high speed cruising. Such an automatic transmission control system is known from, for instance, Japanese Unexamined Patent Publication No. 62-83535.

In the automatic transmission control system, if the temperature of oil is low upon shifting the transmission into the drive range, the hydraulic oil is introduced to a frictional element through the bypass pressure line in order to avoid a delay in locking action of the frictional element due to an increased oil viscosity. If the automatic transmission control system has a frictional element that is locked and unlocked during running and is provided with what is known in the art as a "drift-on ball", the bypass pressure line is opened to introduce the hydraulic oil into the frictional element in order to cause with certainty the closing of the drift-on ball when the frictional element is locked during a high speed cruising.

The drawback to the use of such a prior art automatic transmission control system is that the frictional element requires a longer time to achieve its locking for placing the transmission in a reverse range or in a drive range from a neutral range, particularly when gear shifting is made after acceleration, or when acceleration and gear shifting are simultaneously performed, and generates an increased amount of heat due to slippage. In more detail, a frictional element that is locked to place the transmission in a desired range is, generally, supplied with hydraulic oil through a throttle element, such as an orifice, in order to reduce locking impact. Nevertheless, when an engine load is increased due to an acceleration during the shifting of the transmission into the desired range, the frictional element increases in torque, so as to take a longer time for completing the operation of locking. During the locking operation, the frictional element allows some slippage. This results in an increase in temperature of the frictional element.

SUMMARY OF THE INVENTION

An object of the present invention is to provide a hydraulic control system for an automotive automatic transmission which prevents a frictional element from taking a long time to couple itself and becoming hot.

The object is achieved by a hydraulic control system for shifting a planetary type of automatic transmission of an engine into at least a reverse range and a drive range having a plurality of forward speed gears by selectively coupling a plurality of frictional coupling means, including reverse coupling means, such as a reverse clutch and a low gear reverse brake. A hydraulic control circuit, selectively applying hydraulic pressure to the plurality of frictional coupling means so as to couple necessary frictional coupling elements to shift the automatic transmission into a desired range, is provided with throttle means, such as an orifice, to regulate the hydraulic pressure applied to the reverse coupling means. The control system has a bypass circuit for applying the hydraulic pressure, bypassing the throttle means, to the reverse coupling means which is controlled to open the bypass circuit when a specific operating condition of the automatic transmission is created, such as when the engine operates in a range of lower engine loads or when the reverse coupling element is at a temperature lower than a predetermined temperature, thereby applying the hydraulic pressure through the bypass circuit to the reverse coupling means so as to rapidly achieve a coupling of the reverse coupling means.

In specific element, the bypass circuit cooperates with a solenoid valve or a gear shift solenoid valve, such as a 1-2 shift solenoid valve and 3-4 shift solenoid valve.

BRIEF DESCRIPTION OF THE DRAWINGS

The above and other objects and features of the present invention will be apparent to those skilled in the art from the following description of preferred embodiments thereof, when considered in conjunction with the accompanying drawings. Similar reference numerals have been used to designate the same or similar elements throughout the drawings, in which:

FIG. 2 illustrates tables showing the actuation combinations of various frictional coupling elements to shift the transmission into various ranges and speed gears, and the actuation combinations of shift solenoids to achieve these actuation combinations of frictional coupling elements, respectively;

FIG. 4 is a flow chart illustrating a solenoid control sequence;

DETAILED DESCRIPTION OF THE PREFERRED EMBODIMENTS

Figure 1:
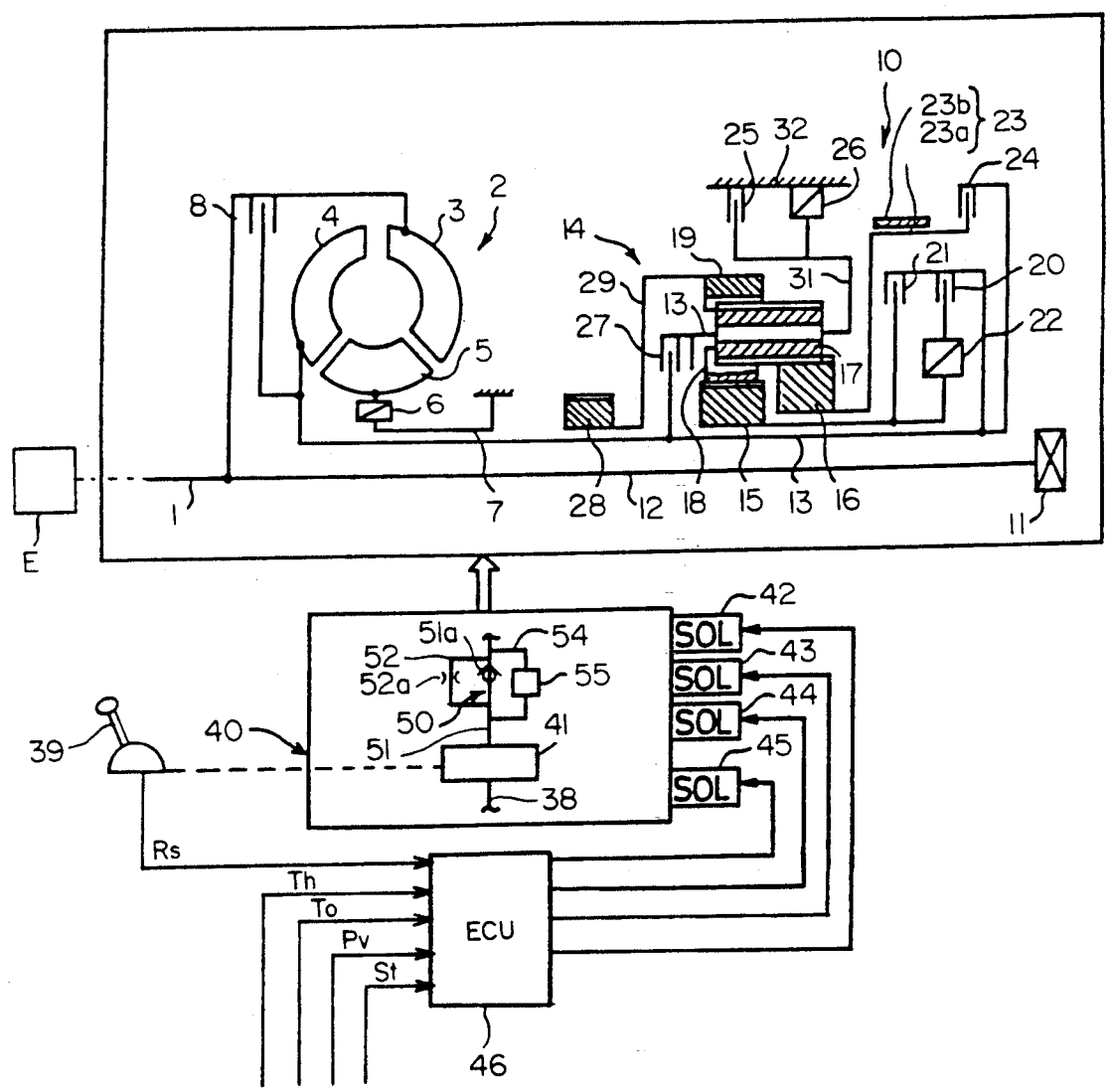
FIG. 1 is a schematic illustration, showing an automatic automotive transmission control system in accordance with a preferred embodiment of the present invention.
Figure 3:
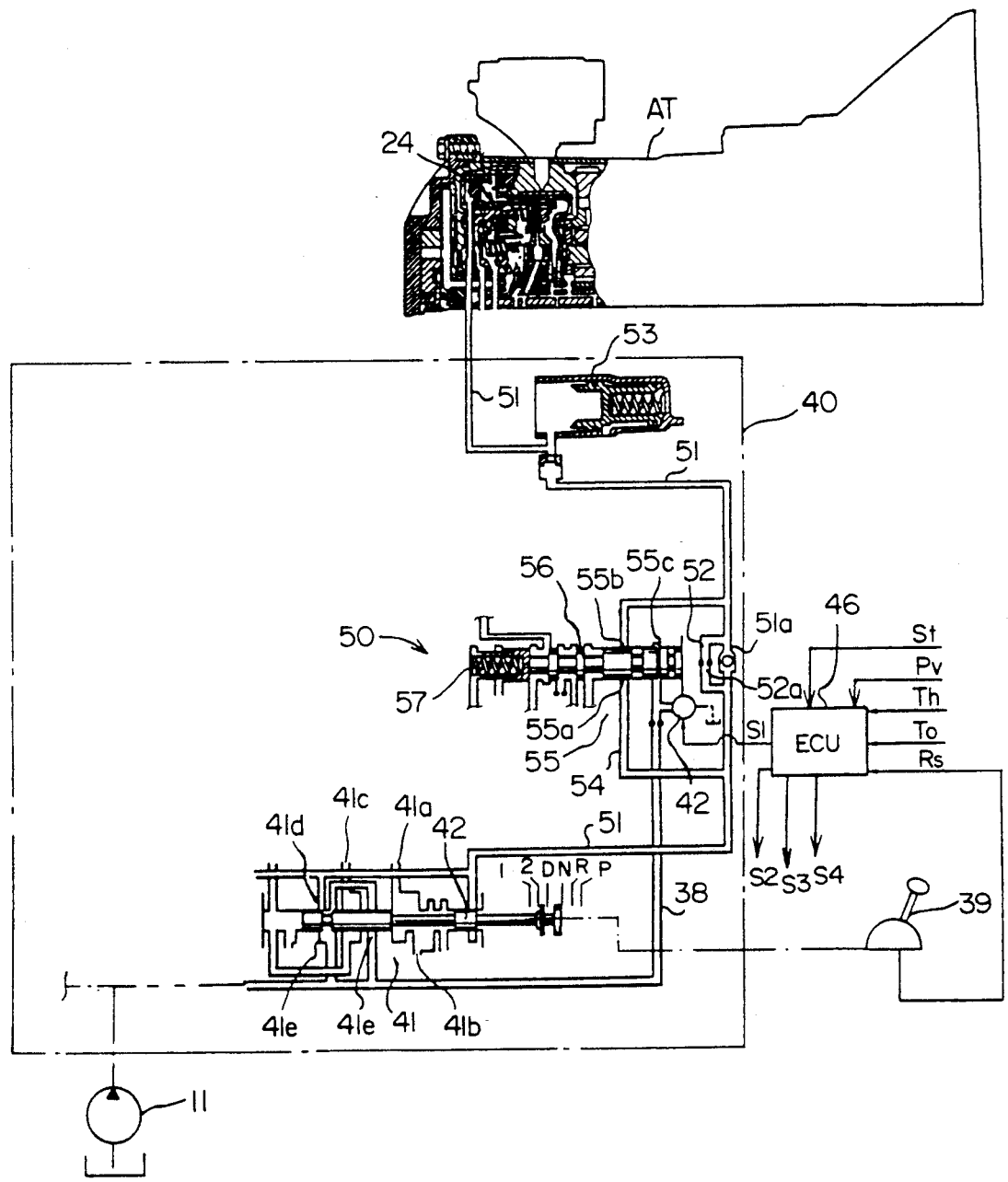
FIG. 3 is a schematic illustration of a pressure control circuit for a reverse clutch.

Referring to the drawings in detail, and in particular to FIGS. 1-3, an automotive automatic transmission AT with a lockup clutch feature, which has a structure and an operation which, in general, are well known in the art, is shown. The transmission includes a multi-ratio transmission 10 and a torque converter 2. The torque converter 2 is connected to an output shaft 1 of an engine E and is operationally coupled to the transmission 10. The torque converter 2 comprises a pump 3 fastened to the engine output shaft 1, a turbine 4 and a stator 5 mounted on a stationary shaft 7 through a one-way clutch 6. The torque convertor 2 is coupled with a lockup clutch 8 for mechanically locking the pump 3 and turbine 4 together.

Multi-ratio transmission 10 includes two shafts, an oil pump shaft 12 coaxially connected to the engine output shaft 1 and a hollow turbine shaft 13 coaxially mounted with the oil pump shaft 12 for rotation. The oil pump shaft 12 is connected at its rear end to an oil pump 11. The turbine shaft 13 is fastened at its front end to the turbine 4 of the torque convertor 2 and is provided with a planetary gear set 14. The planetary gear set 14, which may be of any well known type, comprises a small sun gear 15, a large sun gear 16, a pinion gear assembly including long and short pinion gears 17 and 18, and a ring or internal gear 19.

Planetary gear set 14 cooperates with various frictional coupling elements, such as a forward clutch 20 and a coast clutch 1, which are disposed axially adjacent to each other between the turbine shaft 13 and the small sun gear 15, a reverse clutch 24, a 3-4 shift clutch 27, a 2-4 brake 23 and a low-reverse brake 25. The forward clutch 20 serves to operationally connect and disconnect the turbine shaft 13 from the small sun gear 15 through a first one-way clutch 22 disposed in series with respect to the turbine shaft 13. The coast clutch 21, disposed in parallel with the forward clutch 20 with respect to the turbine shaft 13, serves to operationally connect and disconnect the turbine shaft 13 from the small sun gear 15. The 2-4 brake 23, comprising a brake drum 23a connected to the large sun gear 16 and a brake band 23b surrounding the brake drum 23a, is disposed coaxially with, and radially outside, the coast clutch 21. When the 2-4 brake 23 is actuated, the large sun gear is locked. The reverse clutch 24 is disposed behind the 2-4 brake 23, which operationally connects and disconnects the turbine shaft 13 from the large sun gear 16 through the brake drum 23a. The low reverse brake 25, having a second oneway clutch 26 disposed in series therewith with respect to the carrier 31, is disposed between the carrier 31 of the planetary gear set 14 and part of the transmission casing 32 and mechanically connects and disconnects the carrier 31 from the transmission casing 32. The 3-4 clutch 27 is disposed between the carrier 31 and the turbine shaft 13 so as to operationally connect and disconnect the carrier 31 from the turbine shaft 13.

An output gear 28, disposed in front of the 3-4 shift clutch, is coaxially mounted on, or supported by, the turbine shaft 13 for rotation and is operationally connected to the ring gear 19 by an output shaft 29. The transmission 10 can be placed in any desired range and shifted into four forward and one reverse gears by selectively actuating the clutches 20, 21 and 24 and the brakes 23 and 25 and the one-way clutches 22 and 26 in a well known manner. These ranges and speed gears are accomplished by the combinations of actuation of the frictional coupling elements and one-way clutches 20-26 shown in TABLE I in FIG. 2. Actuated one-way clutches 22 and 26 idle during coasting. To achieve these combinations of actuation of the frictional coupling elements and one-way clutches 20-26, the shift solenoids 42-44 are actuated, or energized, as shown in TABLE II in FIG. 2. When shifting down the transmission 10 from third gear to second gear in drive (D) range, the shift solenoids 42-44 are all energized after the combination of on-off states thereof shown in a column between second (2) and third (3) gears in TABLE II.

All of the frictional coupling elements i.e., (the clutches 20, 21, 24 and 27 and the brakes 23 and 25) and the lock-up clutch 8 are hydraulically controlled by a hydraulic control system 40, shown in FIGS. 1 and 3. This hydraulic control system 40 includes a manual valve 41, manually operated by a driver through a gearshift lever 39 when placing the transmission 10 in any desired range. The manual valve 41, as is well known in the art, has several outlet ports 41a-41e, other than the inlet port 41f, which are selectively opened, and is communicated with the inlet port 41f by a spool 42 so as to place the transmission 10 in any desired range. This range may be the park (P), reverse (R), neutral (N), drive (D), second (2) or first (1) range. Specifically, the spool 42 communicates the inlet port 41f with both the output ports 41a and 41d when the drive (D) range and second (2) range are desired, with both the outlet ports 41a and 41c when the first (1) range is desired, and with the outlet port 41d when the reverse (R) range is desired.

Hydraulic control system 40 further includes a plurality of shift valves, such as a 1-2 shift valve, a 2-3 shift valve, a 3-4 shift valve and a lockup valve (only the 1-2 shift valve 55 is shown in FIG. 3) which are actuated, or controlled, by 1-2 shift solenoid 42, 2-3 shift solenoid 43, 3-4 shift solenoid 44 and a lockup solenoid 45, respectively. All of the solenoids 42-45 are controlled by an electronic control unit (ECU) 46, which comprises basically a general purpose central processing unit, with RAM and ROM, according to driving conditions.

Hydraulic control system 40 comprises various clutch control hydraulic circuits including a reverse clutch control circuit 50 for distributing controlled hydraulic pressure to the reverse clutch 24 to lock, or engage, the reverse clutch 24 when placing the transmission 10 into reverse (R) range. The reverse clutch control circuit 50 comprises a reverse pressure line 51 connected to the manual valve 41 through the outlet port 41d and to the reverse clutch 24 through an accumulator 53, and a reverse pressure bypass line 54 branching off from and connected to the reverse pressure line 51. The reverse pressure line 51 is provided with a one-way valve 51a and a throttle element, such as an orifice 52a, disposed in a bypass line 52 bypassing the one-way valve 51a. The reverse pressure bypass line 54 bypasses the orifice 52a disposed in the bypass line 52 of the reverse pressure line 51. The 1-2 shift valve 55, for automatically shifting the transmission 10 from first to second gear, is disposed, as a bypass control valve, in the reverse pressure bypass line 54.

The 1-2 shift valve 55 is in communication with the main pressure line 38 connected to the oil chamber 55c through the 1-2 shift solenoid 42. The electronic control unit (ECU) 46 receives various signals, such as Pv, To and St, respectively, representative of an operated position of the manual valve 41, the temperature of oil in the hydraulic control system 40, and the speed of rotation of the turbine 4, all of which are detected by well known sensors (not shown), and provides, in response, the 1-2 shift solenoid 42, 2-3 shift solenoid 43, 3-4 shift solenoid 44, and lockup solenoid 45 with control signals S1,S2, S3 and S4 so as to actuate or deactuate these solenoids 42 45, thereby controlling the solenoid valves, including the 1-2 shift valve 55, according to operating conditions.

The operation of the automatic transmission control system depicted in FIGS. 1-3 is best understood by reviewing FIG. 4, which is a flow chart illustrating a 1-2 shift solenoid control routine for the electronic control unit 46. Programming a computer is a skill well understood in the art. The following description is written to enable a programmer having ordinary skill in the art to prepare an appropriate program for the electronic control unit 46. The particular details of any such program would of course depend upon the architecture of the particular computer selected.

The control routine starts immediately after the engine starts to read a position signal Pv in order to make a decision at step S1 whether the manual valve 41 has been changed to the reverse (R) position from the neutral (N) position. If the answer to the decision is no, this indicates that the manual valve 41 has been changed to another position, other than the reverse (R) position. Then, ordinary control is performed so as to actuate the shift solenoid for placing the transmission in a speed range indicated by the other position at step S2.

If the answer to the decision is yes, this indicates that the manual valve 41 has been changed to the reverse (R) position from the neutral (N) position so as to communicate the inlet and outlet ports 41e and 41d of the manual valve 41 with each other, and thereby, a regulated pressure is introduced into the reverse pressure line 51. At the time the manual valve 41 changes its position to the reverse (R) position from the neutral (N) position, the 1-2 shift solenoid 42 for the 1-2 shift valve 55 is turned on to shut down the communication between the oil chamber 55c and main pressure line 38. Accordingly, the spool 56 of the 1-2 shift valve 55 is shifted by the compression coil spring 57, thereby disconnecting the communication between the inlet and outlet ports 55a and 55b of the 1-2 shift valve 55 so as to close the bypass pressure line 54. Following the yes decision at step S1, the electronic control unit 46 reads a signal To representative of the temperature of oil in the hydraulic control circuit 40 and makes a decision based on the signal To whether the temperature of oil is lower than the predetermined critical temperature at step S3. The electronic control unit 46 further reads a signal St representative of the speed of rotation of the turbine 4 of the torque converter 2 and makes a decision, based on the signal St, whether the speed of rotation of turbine 4 is slowing down, or the speed changing factor (dNt/dt) is equal to or smaller than zero (0), at step S4. Slowing down of the speed of rotation of turbine 4 indicates that the reverse clutch 24 has started to engage itself.

When the answer to the decision at step S3 is yes, indicating that the oil temperature is judged to be lower than the predetermined critical temperature, and when both the answers to the decisions at steps S3 and S4 are no, indicating that the reverse clutch 24 is not yet actuated while the oil temperature is judged to be not lower than the predetermined critical temperature, then, the electronic control unit 46 provides the 1-2 shift solenoid 42 with a control signal S1 so as to turn off the 1-2 shift solenoid 42 at step S5. Turning off the 1-2 shift solenoid 42 causes communication between the oil chamber 55c of the 1-2 shift valve 55 and the main pressure line 38, thereby applying the line pressure to the spool 56 of the 1-2 shift valve 55 and shifting the spool 56 against the compression spring 57 so as to communicate the inlet and outlet ports 55a and 55b of the 1-2 shift valve 55. As a result, the bypass pressure line 54 is opened, so as to allow the oil to flow into the reverse clutch 24, not through the part of the reverse pressure line 51 with the orifice 52a, but through the bypass pressure line 54.

If the answers to the decision at step S4 is yes, indicating that the reverse clutch 24 starts its engagement while the oil temperature is judged to be not lower than the predetermined critical temperature, then, the bypass pressure line 54 is left closed so as to force the oil to flow into the reverse clutch 24 through the reverse pressure line 51 with the orifice 52a. That is, the electronic control unit 46 removes the control signal S1 so as to turn on the 1-2 shift solenoid 42 at step S6.

Figure 5A:
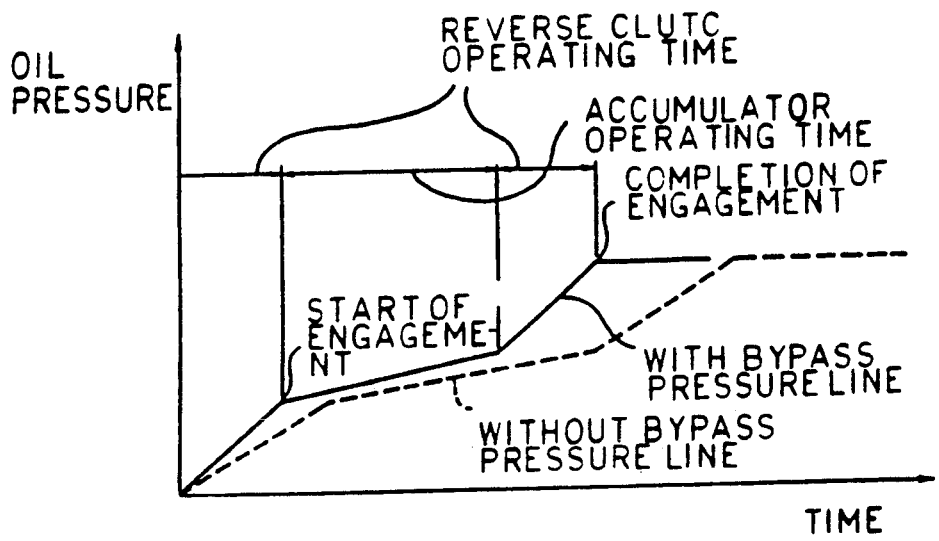
FIGS. 5A and 5B are diagrams showing pressure changes in oil in a reverse clutch control circuit when oil is at lower temperatures and at ordinary temperatures, respectively.
Figure 5B:
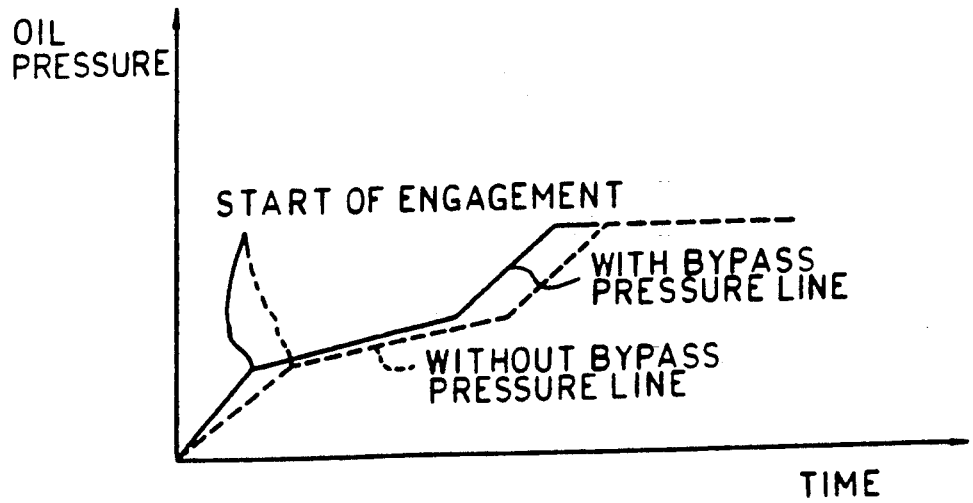

As is shown in FIG. 5A, when the oil is in a low temperature range, the time required for the hydraulic control system 40 with the bypass pressure line 54 to achieve engagement of the reverse clutch 24 is much less than for the conventional hydraulic control system with no bypass pressure line. Shortening the time required to put the reverse clutch in ensures reliable response in shift operation of the transmission from the neutral range to the reverse range. Furthermore, as is shown in FIG. 5B, when the oil is in the ordinary temperature range, the time required for the hydraulic control system 40 with the reverse pressure bypass line 54 to start engagement of the reverse clutch 24 is much less than in a conventional hydraulic control system with no bypass pressure line, and the engaging operation of the reverse clutch 24 is performed more gently by the aid of the orifice 52a and accumulator 53 provided in the reverse pressure line 51. This gentle engagement ensures a reliable response, in the shift operation, of the transmission from the neutral rang to the reverse range, and avoids the occurrence of shock and reduces impact during a shift operation of the transmission.

Because closing and opening of the bypass pressure line for the reverse clutch 24 is performed by the use of the 1-2 shift valve, the automatic transmission, according to the present invention, is smaller in size than the conventional automatic transmission. Also, because, when the transmission is placed in the reverse range, the shaft element with which the 1-2 shift valve inherently cooperates receives no line pressure, and the transmission is not adversely affected in shift operation by operating the 1-2 shift valve.

Figure 6:
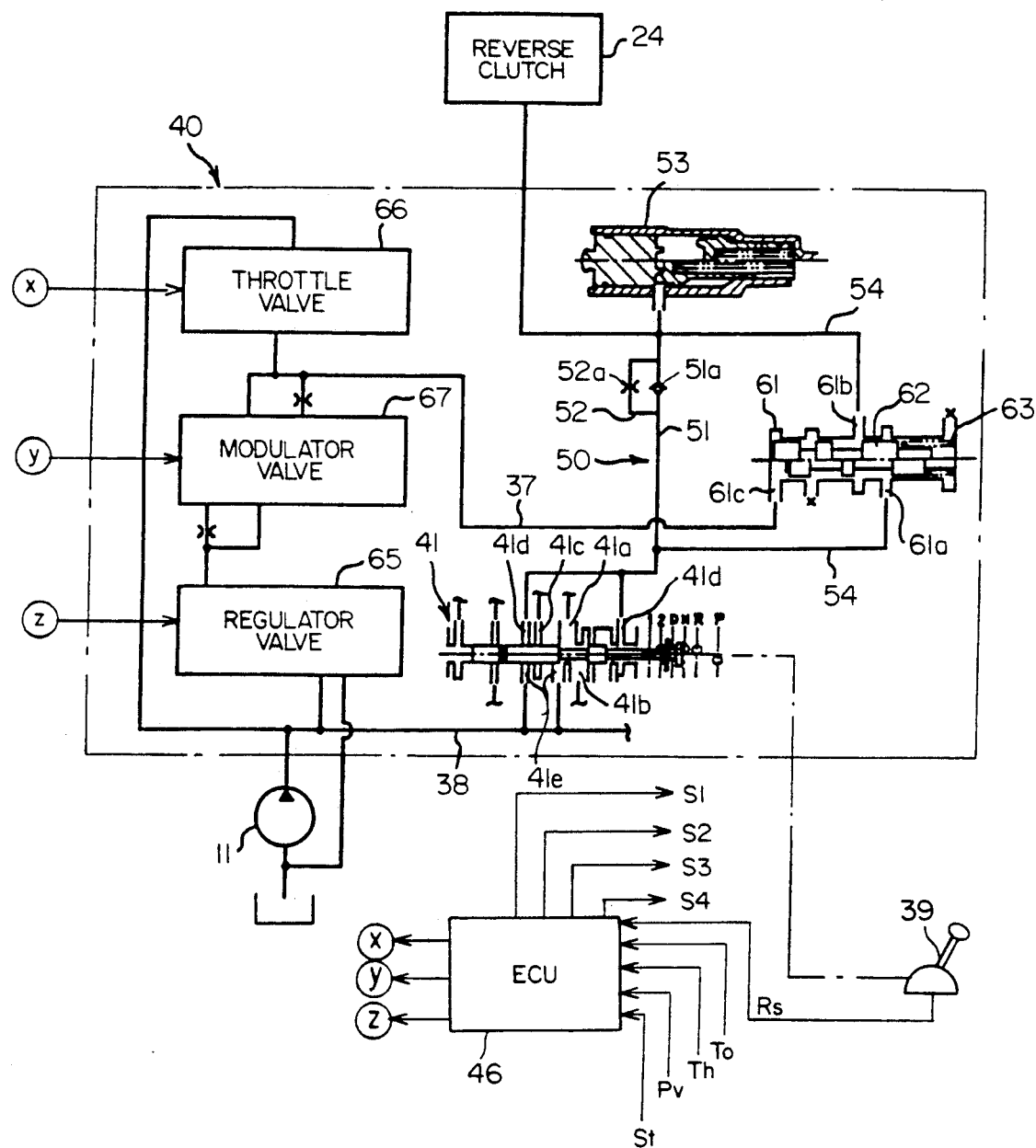
FIG. 6 is a schematic illustration of a pressure control circuit for a reverse clutch of an automatic transmission control system in accordance with another preferred embodiment of the present invention.

Referring to FIG. 6, which schematically illustrates a hydraulic control circuit 40 in accordance with another preferred embodiment in a reverse pressure bypass line in order to open and provided in a reverse pressure bypass line in order to open and close the reverse pressure bypass line. Main line pressure discharged from the oil pump 11 into a main pressure line 38 is regulated in pressure by a regulator valve 65. The regulator valve 65 is connected to a throttle valve 66 through a throttle modulator valve 67. The throttle valve 66 is operated by the control unit 46 to open and close according to engine loads so as to develop an oil pressure proportional to the engine load, which can be represented by a signal Th sent from a throttle sensor, well known in the art. The oil pressure developed by the throttle valve 66 is, after being reduced by the throttle modulator valve 67, forwarded to the regulator valve 65. The regulator valve 65 regulates the oil pressure so as to provide a line pressure precisely suitable for an engine torque of the engine. Regulated main line pressure is introduced into an inlet port 41e of the normal valve 41.

Reverse clutch control circuit 50 has a reverse pressure line 51 connecting the outlet port 41d of the manual valve 41 to the reverse clutch 24. An accumulator 53 is disposed in the reverse pressure line 51 immediately before the reverse clutch 24 for preventing a rapid raise in pressure in the reverse pressure line 51 upon locking the reverse clutch 24. The manual valve 41 locates its spool 42 at the reverse range position when the gearshift lever 39 is operated to place the transmission 10 in the reverse (R) range, so as to communicate the inlet port 41e to the outlet port 41d, thereby introducing the regulated line pressure into the reverse clutch 24 through the reverse pressure line 51. The reverse pressure line 51 is provided with a one-way valve 51a and a throttle element, such as an orifice 52a, disposed in a bypass line 52 bypassing the one-way valve 51a.

A reverse pressure bypass line 54 branches off from and is connected to the reverse pressure line 51 so as to bypass the orifice 52a disposed in the bypass line 52 of the reverse pressure line 51. The reverse pressure bypass line 54, bypassing the orifice 52 as described above, is provided with a control valve 61 having a spring loaded spool 62. The control valve 61 is provided with an inlet port 61a connected to the reverse pressure line 51 downstream of the orifice 52a and an outlet port 61b connected to the reverse pressure line 51 upstream of the orifice 52a. The control valve 61 is further provided with a pilot port 61c connected by a pilot pressure line 37 to the throttle valve 66 so as to introduce therein a pilot pressure to urge the spool 62 against a spring 63. As was previously stated, the throttle valve 66 is operated by the control unit 46 according to engine loads, or throttle openings, and develops an oil pressure proportional to a throttle opening. Therefore, the pilot pressure introduced into the control valve 61 is also proportional to the throttle opening, or engine load. The spring 63 is designed so as to shift the spool 62 against the pilot pressure and to disconnect the communication between the inlet and outlet ports 61a and 61b when the pilot pressure is lower than a predetermined critical pressure, thereby disconnecting the bypass line 54 from the reverse pressure line 51. The spool 62 is allowed to be shifted by the pilot pressure so as to communicate the inlet port 61a with the outlet port 61b when the pilot pressure is higher than the predetermined critical pressure, thereby connecting the reverse pressure bypass line 54 to the reverse pressure line 51.

In operation of the automotive transmission control system, when the reverse (R) range is selected, the manual valve 41 communicates the inlet port 41e with the outlet port 41d. As a result, the reverse pressure line 51 is connected to the main pressure line 38. If the engine operates at lower loads, the control valve 61 disconnects the reverse pressure bypass line 54 from the reverse pressure line 51, so that a line pressure is introduced, as a reverse line pressure, into the reverse clutch 24 through the reverse pressure line 51 and the orifice 52a. Because the reverse line pressure is gently raised by the aid of the orifice 52a, the reverse clutch 24 locks without accompanying impact.

If the selecting of the reverse (R) range is effected during an increase in engine load that is caused by depressing an acceleration pedal for acceleration, pilot pressure introduced into the control valve 61 from the throttle valve 66 through the pilot pressure line 37 raises above the specific pressure, so as to cause the control valve 61 to communicate the inlet and outlet ports 61b and 61c with each other and thereby to open the reverse pressure bypass line 54. As a result, the hydraulic oil passed through the manual valve 41 flows through the reverse pressure bypass line 54 and is introduced rapidly into the reverse clutch 24. This flow of hydraulic oil develops a rapid raise in reverse pressure in the reverse clutch 24 sufficient to lock the reverse clutch 24. Therefore, the reverse clutch 24 does not take a longer time to complete its lockage and produces less slippage, so as to prevent the hydraulic oil from producing heat and raising its temperature.

Figure 7:
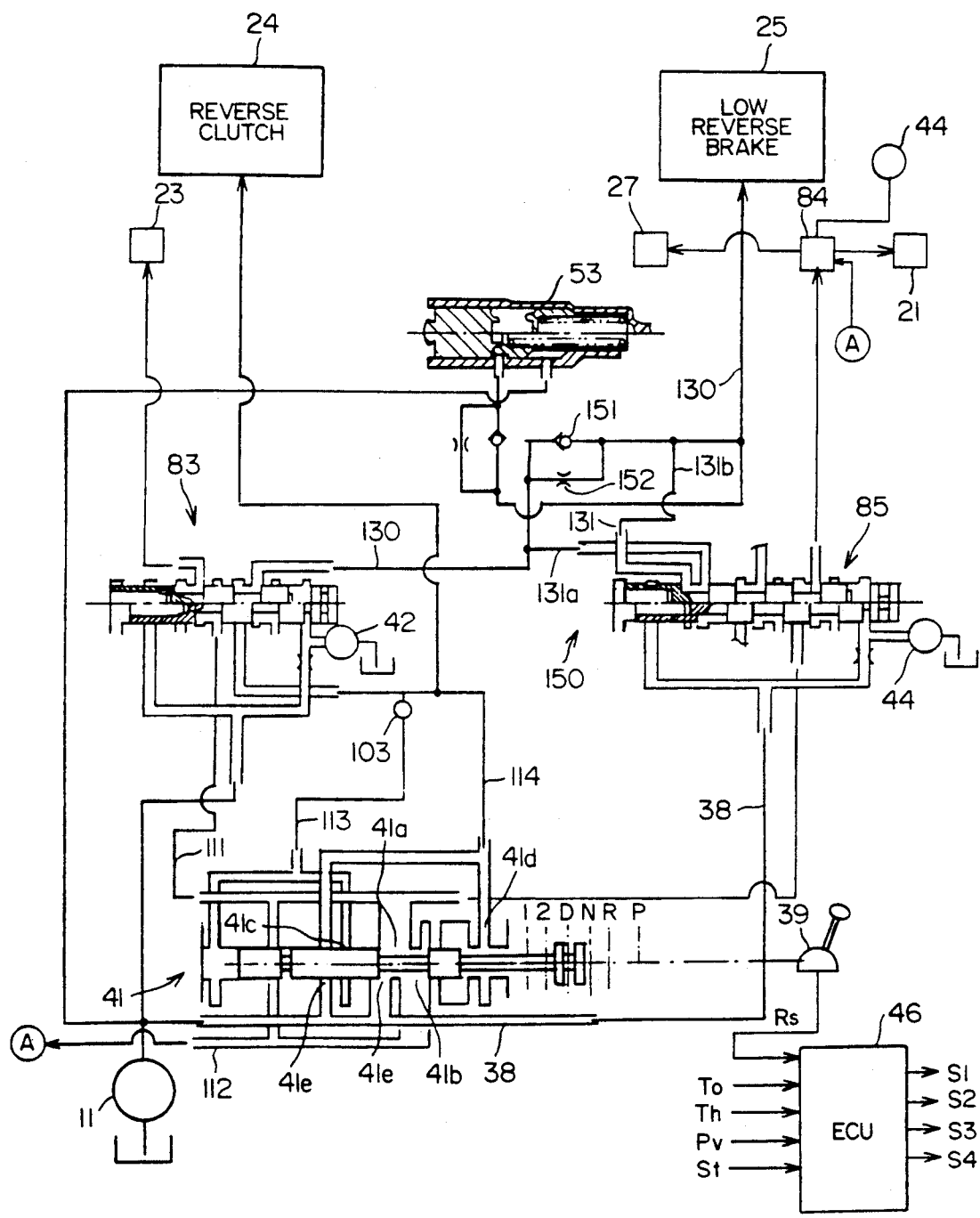
FIG. 7 is a schematic illustration of a pressure control circuit for a reverse clutch of an automatic transmission control system in accordance with still another preferred embodiment of the present invention.

Referring to FIG. 7, which schematically illustrates part of a hydraulic control circuit 40 in accordance with another preferred embodiment of the present invention, a low reverse brake control circuit 150 distributes controlled hydraulic pressure to the low gear reverse brake 25 so as to lock, or engage, the low reverse brake 25 when placing the transmission 10 into the reverse (R) range while it is in low speed gear.

Main line pressure discharged from the oil pump 11 into a main pressure line 38 is introduced into an inlet port 41e of the manual valve 41. The manual valve communicates the inlet port 41e with first and second outlet ports 41a and 41b when shifting the transmission 10 into the drive (D) range and the second (2) range; with first and third outlet ports 41a and 41c when shifting the transmission 10 into the first (1) range; and with fourth outlet port 41d when shifting the transmission 10 into the reverse (R) range. These outlet ports 41a-41d are connected to first to fourth pressure lines 111-114.

The first pressure line 111 is connected to the forward clutch 21 so as to lock the forward clutch 21 when shifting the transmission into the drive (D) range, second (2) range and first (1) range. The first pressure line 111 is also connected to the 1-2 shift valve 83 so as to lock a 2-4 brake 23 when the transmission 10 shifts itself into the second speed gear or the fourth speed gear in the drive (D) range, the second speed gear in the second (2) range and the second speed gear in the first (1) range. The first pressure line 111 is further connected to the 3-4 shift valve 85 so as to connect the main pressure line to a 2-3 shift valve 84 when the 3-4 shift solenoid 44 is turned off. If the 2-3 shift solenoid 43 is turned on, the 2-3 shift valve 84 connects the main line to the coast clutch 21 so as to lock the coast clutch 21. That is, the coast clutch 21 is locked when the transmission 10 shifts itself to the second speed gear in the second (2) range and the first or second speed gear in the first (1) range.

Second pressure line 112, communicated with the main pressure line 38 through the outlet port 41b of the manual valve 41, is connected to the 2-3 shift valve 84. If the 2-3 shift solenoid 44 is turned off, the 2-3 shift valve 84 connects the second pressure line 112 to the 3-4 shift clutch 27, so as to lock the 3-4 shift clutch 27 when the transmission 10 shift itself to the third or fourth speed gear in the drive (D) range and the third speed gear in the third (3) range.

Third pressure line 113, communicated with the main pressure line 38 through the outlet port 41c of the manual valve 41, is provided with a ball valve 103 disposed therein and is connected to the 1-2 shift valve 83. If the 1-2 shift solenoid 42 is turned off, the 1-2 shift valve 83 connects the third pressure line 113 to the low reverse brake 25 by way of a reverse brake pressure line 130 with a one-way valve 151 and a throttle element, such as an orifice 152, provided in parallel therein. If the 1-2 shift solenoid 42 is deenergized, or turned off, the 1-2 shift valve 83 connects the main pressure line to the low reverse brake 25 through the third pressure line 113 and reverse brake pressure line 130 so as to lock the low reverse brake 25. That is, the low reverse brake 25 is locked when the transmission 10 shifts itself into the first speed gear in the first (1) range.

A reverse brake pressure line 130 is provided with a reverse brake pressure bypass line 131 connected thereto upstream and downstream of the orifice 152. The reverse brake pressure bypass line 131 is connected to, and controlled to be opened and closed by, the 3-4 shift valve 85. When the 3-4 shift solenoid 44 is deenergized, or turned off, the 3-4 shift valve 85 opens the reverse brake pressure bypass line 131.

Fourth pressure line 114, communicated with the main pressure line 38 through the outlet port 41d of the manual valve 41, is connected to the third pressure line 113, the 1-2 shift valve 83 and the reverse clutch 24. In the reverse (R) range, the reverse clutch 24, as well as the low reverse brake 25, is locked only when the 1-2 shift solenoid 42 is deenergized, or turned off.

An accumulator 53 is connected to the reverse brake pressure line 130 immediately before the low reverse brake 25 for preventing a rapid raise in pressure in the low reverse brake pressure line 130 upon locking the low reverse brake 25.

The control unit 46 reads a signal To representative of the temperature of oil in the hydraulic control circuit 40 and makes a decision based on the signal To whether the temperature of oil is lower than the predetermined critical temperature. As a result of the decision, the oil temperature may be judged to be lower than the predetermined critical temperature. Then, the electronic control unit 46 provides the 3-4 shift solenoid 44 with a control signal S1 so as to turn off the 3-4 shift solenoid 44. Turning off the 3-4 shift solenoid 44 causes the 3-4 shift valve 85 to open the reverse brake pressure bypass line 131. As a result, the main line pressure introduced into the reverse brake pressure line 130 is directed toward the low reverse brake 25, not through the orifice 152 in the reverse brake pressure line 130, but through the reverse brake pressure bypass line 131.

Although the control system has been described with respect to shifting the automatic transmission from a neutral range to a reverse range, nevertheless, it can be adapted with the same results so as to shift the automatic transmission from a park range or drive range to a reverse range.

It is to be understood that although the present invention has been described in detail with respect to a specific preferred embodiment, nevertheless, various other embodiments and variants are possible which are within the scope and spirit of the invention. Such other embodiments and variants are intended to be covered by the following claims.

What is claimed is:

1. A hydraulic control system for a planetary type automatic transmission of an engine, shiftable into at least a reverse range and a drive range having a plurality of forward speed gear stages by selectively coupling a plurality of frictional coupling means, including reverse coupling means, the hydraulic control system comprising:

a hydraulic control circuit for selectively applying hydraulic pressure to the plurality of frictional coupling means so as to couple necessary frictional coupling elements to shift the automatic transmission into a desired range, said hydraulic control circuit including at least one shift valve for providing a desired one of said forward speed gear stages;

throttle means disposed in said hydraulic control circuit for controlling said hydraulic pressure applied to the reverse coupling means;

a bypass circuit for applying said hydraulic pressure, bypassing said throttle means, to said reverse coupling means; and control means for actuating said at least one shift valve, to selectively provide the desired one of said forward speed gear stages, and to open said bypass circuit when a specific operating condition of the automatic transmission of the engine is created, thereby applying said hydraulic pressure through said bypass circuit to said reverse coupling means so as to rapidly achieve a coupling of said reverse coupling means.

2. A hydraulic control system as recited in claim 1, wherein said reverse coupling means comprises a reverse clutch.

3. A hydraulic control system as recited in claim 2, wherein said control means comprises a solenoid valve operating said at least one shift valve to open said bypass circuit.

4. A hydraulic control system as recited in claim 3, wherein said solenoid valve is operated when the engine operates in a range of higher engine loads to open said bypass circuit.

5. A hydraulic control system as recited in claim 3, wherein said solenoid valve is operated when said reverse coupling means is at a temperature lower than a predetermined temperature to open said bypass circuit.

6. A hydraulic control system as recited in claim 3, wherein said at least one shift valve is for shifting the automatic transmission between first and second gears.

7. A hydraulic control system as recited in claim 6, wherein said solenoid valve is operated when the engine operates in a range of higher engine loads to open said bypass circuit.

8. A hydraulic control system as recited in claim 6, wherein said hydraulic control circuit includes a oil for bearing said hydraulic pressure.

9. A hydraulic control system as recited in claim 8, wherein said solenoid valve is operated when said reverse coupling means is at a temperature lower than a predetermined temperature to open said bypass circuit.

10. A hydraulic control system as recited in claim 1, wherein said reverse coupling means comprises a low gear reverse brake.

11. A hydraulic control system as recited in claim 10, wherein said at least one a shift valve is for shifting the automatic transmission between third and fourth gears.

12. A hydraulic control system as recited in claim 11, wherein a solenoid valve is operated when the engine operates in a range of higher engine loads to open said bypass circuit.

13. A hydraulic control system as recited in claim 12, wherein said solenoid valve is operated when said reverse coupling means is at a temperature lower than a predetermined temperature to open said bypass circuit.

14. A hydraulic control system as recited in claim 1, wherein said throttle means comprises a one-way valve and an orifice which are disposed in parallel to each other with respect to said coupling means.

* * * * *